(12) United States Patent
Gans et al.

(10) Patent No.: US 9,028,990 B2
(45) Date of Patent: May 12, 2015

(54) FUEL CELL EMERGENCY SYSTEM

(75) Inventors: Hubert Gans, Hamburg (DE);
Ralf-Henning Stolte, Hamburg (DE);
Volker Piezunka, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1381 days.

(21) Appl. No.: 11/817,939

(22) PCT Filed: Mar. 6, 2006

(86) PCT No.: PCT/EP2006/002035
§ 371 (c)(1),
(2), (4) Date: Oct. 12, 2007

(87) PCT Pub. No.: WO2006/094743
PCT Pub. Date: Sep. 14, 2006

(65) Prior Publication Data
US 2008/0210812 A1    Sep. 4, 2008

Related U.S. Application Data

(60) Provisional application No. 60/659,359, filed on Mar. 7, 2005.

(30) Foreign Application Priority Data

Mar. 7, 2005  (DE) .......................... 10 2005 010 399

(51) Int. Cl.
*B64D 27/00*   (2006.01)
*B64D 41/00*   (2006.01)
*B64D 35/00*   (2006.01)
(Continued)

(52) U.S. Cl.
CPC ......... *H01M 8/04201* (2013.01); *B64D 41/007* (2013.01); *H01M 8/04007* (2013.01); *H01M 8/04089* (2013.01); *H01M 8/04365* (2013.01); *H01M 8/04731* (2013.01); *B64D 41/00* (2013.01); *H01M 8/04313* (2013.01); *H01M 8/04* (2013.01); *B64D 2041/005* (2013.01);
(Continued)

(58) Field of Classification Search
None
See application file for complete search history.

(56) References Cited

U.S. PATENT DOCUMENTS 4,883,724 A * 11/1989 Yamamoto .................... 429/431
4,926,108 A *  5/1990 Schooley et al. ............... 322/15
(Continued)

FOREIGN PATENT DOCUMENTS

DE     1200611        9/1965
DE     19821952 A1   11/1999
(Continued)

OTHER PUBLICATIONS

Japanese Notice of Allowance dated Mar. 27, 2012 for Japanese application No. 2008-500105, 2 pages.
(Continued)

*Primary Examiner* — Ula C Ruddock
*Assistant Examiner* — Matthew Van Oudenaren
(74) *Attorney, Agent, or Firm* — Christopher Paradies; Paradies Law P.A.

(57) ABSTRACT

In an embodiment, a fuel cell system for supplying emergency power to an aircraft, includes a fuel cell, a hydrogen tank, an oxygen tank, and a power distribution unit. This provides for an emergency power supply for aircraft that is reliable, independent of the outside air, and has low maintenance needs.

9 Claims, 2 Drawing Sheets

(51) Int. Cl.
  *B64D 37/00* (2006.01)
  *B64B 1/24* (2006.01)
  *H01M 8/04* (2006.01)

(52) U.S. Cl.
  CPC ............ *H01M2250/20* (2013.01); *Y02T 90/32* (2013.01); *Y02T 90/36* (2013.01); *Y02E 60/50* (2013.01)

(56) References Cited

U.S. PATENT DOCUMENTS

| | | | |
|---|---|---|---|
| 5,106,035 A | 4/1992 | Langford, III | |
| 6,296,957 B1 | 10/2001 | Graage | |
| 6,551,731 B1 | 4/2003 | Berg et al. | |
| 2001/0028967 A1* | 10/2001 | Roberts et al. | 429/13 |
| 2003/0075643 A1 | 4/2003 | Dunn | |
| 2004/0028966 A1 | 2/2004 | Hibbs et al. | |
| 2004/0069897 A1 | 4/2004 | Corcoran | |
| 2004/0118969 A1 | 6/2004 | MacCready et al. | |
| 2004/0155149 A1 | 8/2004 | Dossas et al. | |
| 2004/0245390 A1* | 12/2004 | Meckes et al. | 244/118.5 |

FOREIGN PATENT DOCUMENTS

| | | |
|---|---|---|
| JP | 6196674 A | 7/1994 |
| JP | 7-301191 A | 11/1995 |
| JP | 2000-314376 A | 11/2000 |
| JP | 2002-195218 A | 7/2002 |
| JP | 2004-523327 A | 8/2004 |
| JP | 2005-053353 A | 3/2005 |

OTHER PUBLICATIONS

Office Action of Japanese Patent Application No. 2008-500105 and short English translation summary thereof, 3pages.

* cited by examiner

FUEL CELL EMERGENCY SYSTEM

REFERENCE TO RELATED APPLICATIONS

This application claims the benefit of the filing date of U.S. Provisional Patent Application No. 60/659,359 filed Mar. 7, 2005, and of the German Patent Application No. 10 2005 010 399.5 filed Mar. 7, 2005, the disclosures of which are hereby incorporated herein by reference.

FIELD OF THE INVENTION

The field relates to emergency power supply for aircraft.

BACKGROUND OF THE INVENTION

In contemporary aircraft, ram air turbines (RAT) are used to provide emergency power, given a failure of the engines, generators or hydraulic systems, by generating a free flow toward the rotor. The ram air turbines are here within an aerodynamic cladding when non-operative, and are mechanically folded out in emergency situations.

Depending on the system configuration of the aircraft, the ram air turbine rotor shaft driven by the stream of air powers a hydraulic pump, or an electric generator. The energy of the ram air turbine is here used above all for primary flight control.

The ram air turbine system is mechanically complex in light of the deployment mechanism (out folding mechanism) and rotating components. The system performance decreases with diminishing flight velocity and decreasing outside pressure, while the need for emergency power is particularly high precisely before or while landing. The ram air turbine and its operability cannot be permanently monitored. The ram air turbine can only ensure full power at a flow that is as uninfluenced as possible by the aircraft boundary layer. For this reason, integrating the ram air turbine into the aircraft is a complicated process.

SUMMARY OF THE INVENTION

An object of the fuel cell emergency system is to provide an improved emergency power supply system.

In an embodiment, the above object is achieved by a fuel cell system for supplying power to an aircraft, comprising a fuel cell, a hydrogen tank and an oxygen tank, wherein the hydrogen tank and oxygen tank are connected to the fuel cell to supply the fuel cell.

In this example, embodiment of the fuel cell system always ensures that the fuel cell is supplied with sufficient quantities of hydrogen gas and oxygen gas at all times during its operation, even if the aircraft is at high altitudes where the outside pressure is low, for example. Directly supplying the fuel cell system with hydrogen and oxygen from corresponding containers or tanks ensures a rapid startup of the fuel cell system, without having to compress ambient air beforehand for supplying the fuel cells. Since the fuel cell system has no or few moving components, very high system availability is assured.

In another embodiment, the fuel cell is designed as a low-temperature fuel cell, wherein the fuel cell is arranged inside a cabin of the aircraft.

Arranging the fuel cell inside the cabin of the aircraft advantageously always provides for a sufficiently high ambient temperature during normal aircraft operation, such that the fuel cell can be directly and quickly started up even without a warm-up phase. This advantageously makes it possible to save on heating energy, which would be necessary if the fuel cell were to be installed outside the heated pressurized area of the cabin under ambient conditions.

In another embodiment, the hydrogen tank is designed as a hydrogen compressed gas cylinder, and the oxygen tank in the form of an oxygen compressed gas cylinder.

This provides for a reliable and flexible accumulation and storage of hydrogen and oxygen resources. For example, the hydrogen and oxygen compressed gas cylinders can be stored in such a way as to be easily accessible to maintenance personnel, such that they can check their operability or change out cylinders. This significantly reduces the maintenance and repair outlay for the emergency system.

In another embodiment, the oxygen tank can further be used for supplying passengers with emergency oxygen during a pressure drop in the cabin. As a result, emergency supply components (oxygen reservoirs) may be advantageously reduced, thereby eliminating the need for a separate, additional oxygen tank for the fuel cell system. In addition, the oxygen tank of the fuel system can be designed for supplying emergency oxygen to the passengers and simultaneously supplying the fuel cell, yielding a redundancy that further increases safety.

In another embodiment, the fuel cell system also comprises a power distribution unit. The fuel cell system is inactive during normal aircraft operation, and the power distribution unit is designed in such a way that it can automatically activate the fuel cell system given an undersupply of power.

This advantageously ensures that the fuel cell system consumes no resources (that it accesses during emergency operation) during normal aircraft operation, thereby reducing the maintenance expenses for the emergency system (since, for example, the hydrogen tank and oxygen tank must only be changed out after use of the fuel cell system, or after a defined maintenance interval). In addition, the power distribution unit can be designed for automatically and rapidly activating the fuel cell system, which reacts to a voltage drop in the aircraft power supply system, for example. In order to increase system reliability, the automatic connection of the fuel cell system can be such that a relay or comparable switching element automatically activates the fuel cell system given an undersupply of power or voltage drop.

In another embodiment, the fuel cell system further has a converter (transformer), which is designed for generating a current/voltage characteristic suitable for onboard operation.

In addition, a cooling system designed to cool at least the fuel cell can be connected. This ensures the prevention of an undesired fuel cell operating temperature increase, even at an elevated power of the fuel cell. As a result, the fuel cell can be operated continuously.

In addition, the transformer or another regulating device (e.g., the power Distribution unit) connect or disconnect fuel cells in order to adjust system power to the changing requirements at a varying power demand.

In another embodiment, the fuel cell system also comprises a temperature regulating device for regulating the temperature of the fuel cell, so that the temperature of the fuel cell is maintainable within a predetermined range.

The temperature regulating device may not only be used to cool the fuel cell, but may also be used for heating purposes, e.g., to provide for a sufficient starting temperature for the fuel cell. This makes it possible to shorten the startup phase of the fuel cell system.

In another embodiment, the fuel cell system also comprises a hydraulic pump that is driven by the electrical current of the fuel cell, where the hydraulic pump is designed to provide hydraulic energy to an aircraft control system. This ensures that always sufficient hydraulic power is available for the aircraft control system.

In another embodiment, a simple, quick and reliable method is indicated for emergency power supply in an aircraft, in which hydrogen from a hydrogen tank is supplied to the fuel cell to provide the fuel cell with hydrogen gas. In addition, oxygen is supplied from an oxygen tank to the fuel cell in order to supply oxygen gas to the fuel cell. The hydrogen gas and oxygen gas supplied to the fuel cell are used to generate electrical energy inside the fuel cell for purposes of emergency power supply, wherein the hydrogen tank and oxygen tank are connected to the fuel cell to supply the fuel cell. Using the method ensures emergency power supply in an aircraft that is independent of outside air, has a short startup phase, and can largely be designed without moving mechanical components.

In another embodiment, the fuel cell stack can be "dead-ended" (cascaded) or be operated via recirculating flow, e.g. of a jet pump, in order to minimize emissions.

In another embodiment, a passive water separator can be used as an integral component for pressure regulation.

Additional exemplary embodiments are described in the dependent claims and independent claims.

Embodiments will be described with reference to the figures. The examples described and drawings rendered are illustrative and are not to be as limiting the scope of the invention as it is defined by the appended claims.

BRIEF DESCRIPTION OF THE FIGURES

FIG. 1 shows a view of a ram jet turbine, which consists of a rotor 1 and hydraulic pump 2. The ram jet turbine is retracted in a non-operative state, and is mechanically folded out in an emergency, e.g., during a failure of the engines, onboard hydraulic system or generators. An airstream hits the rotor, generating mechanical energy, which drives the hydraulic pump 2. Owing to a complicated out folding mechanism, which has to be able to withstand enormous mechanical stress, and owing to the rotating components the construction of the ram jet turbine and of the mounting is mechanically complex. The ram air turbine and its operability cannot be permanently monitored as a rule, and hence requires an additional maintenance effort.

FIG. 2 shows a diagrammatic view of a fuel cell emergency system according to an embodiment. As evident from FIG. 2, the fuel cell emergency system comprises metering valves 42, 43, power distribution unit 46, switches and lines 44, 45 and a fuel cell device 4 which comprises a fuel cell stack 41 having a plurality of fuel cells. The fuel cell device 4 is arranged inside a fireproof housing 10, for example, which can also accommodate fire detection and extinguishing equipment. The educts or waste gases arising during the operation of the fuel cell device 4 can be removed from the housing 10 by way of a ventilating line 47 and metering valves 42, 43.

Figure 1:
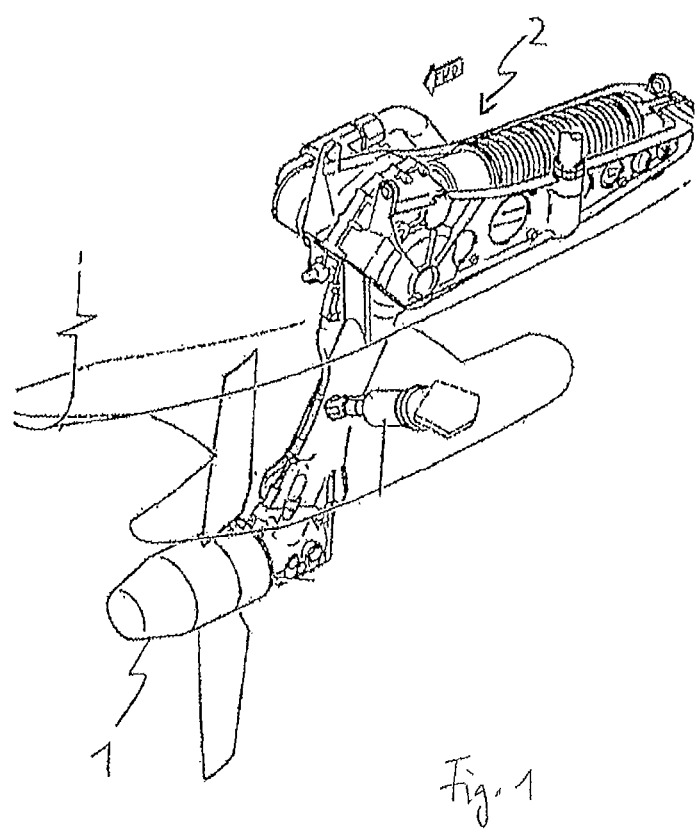
FIG. 1 shows a diagrammatic view of a ram air turbine.
Figure 2:
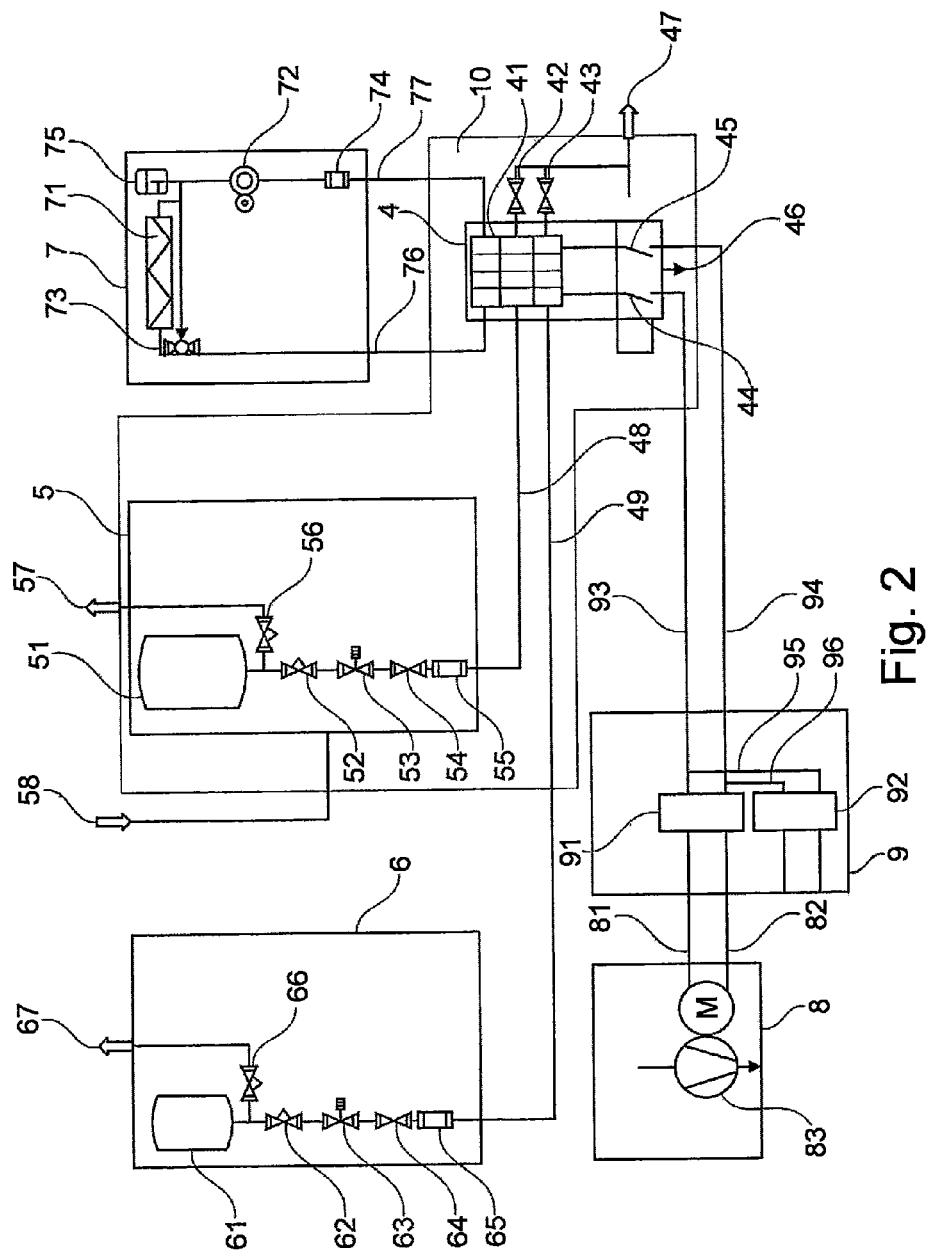
FIG. 2 shows a diagrammatic view of a fuel cell system according to an embodiment.

The fuel cells 41 are supplied with hydrogen and oxygen. To this end, a hydrogen preparation device 5 and oxygen preparation device 6 are provided, which are connected via corresponding lines 48, 49 with the fuel cell device 4.

The hydrogen preparation device 5 comprises a hydrogen reservoir 51, valves 52, 53, 54, 56, supply line 58 and filter 55. In addition, the hydrogen preparation device 5 comprises a ventilation line 57.

The hydrogen tank 51 can be designed as a hydrogen compressed gas cylinder 51, which is easy to maintain and can be quickly replaced. The hydrogen preparation device 5 can be arranged inside a fireproof housing 10, for example, the same housing 10 that incorporates the fuel cell device 4. Naturally, however, it can also be a separate housing 10.

The hydrogen stored in the hydrogen tank 51 is released to the fuel cells 41 via the line 48. The release rate can be set using the pressure regulating valve 52 and serially connected solenoid valve 53. In addition, a safety valve can be provided, for example, which can prevent the stream of gas from returning from the fuel cell device 4 into the hydrogen tank 51. The safety valve 54 can also be used to prevent an undesired oversupply of the fuel cell device 4 with hydrogen. The redundancy of the three valves 52, 53, 54 ensures a high level of system safety. In addition, a filter 55 can be provided, for example, within the hydrogen preparation device 5, which is arranged after the valves 52 to 54, and which provides a filtering of the gas before it is introduced into the fuel cells 41. Naturally, the filter can also be situated directly in front of the fuel cells 41 or the fuel cell device 4.

In addition, a pressure relief valve or pressure regulating valve 56 can be provided to discharge hydrogen from the housing 10 given an excessive pressure rise or hydrogen oversupply. The line 57 is used for this purpose. For example, the housing 10 can be fireproof.

Line 58 is used to ventilate the space between the inside of the housing 10 and the housing environment, for example.

Oxygen is supplied via the oxygen preparation device 6, which has an oxygen tank 61 and valves 62, 63, 64, 66 and a filter 65. The oxygen tank 61 can be designed as a compressed gas cylinder, for example, which can be easily and quickly maintained or replaced.

In addition to supplying the fuel cells 41 with oxygen, the oxygen tank 61 can also be used to supply emergency oxygen to the passengers. For example, oxygen tank redundancy is possible here, so that the passengers can procure oxygen from the oxygen tank in case of emergency, or vice versa, the fuel cells 41 can draw upon oxygen provided for the passengers.

The valve 62 is used to regulate the pressure inside the line system 49. A solenoid valve 63 can also be provided, connected to the control valve 62 upstream or downstream. A safety valve 64 can also be provided. The redundancy of the serially connected valves 62 to 64 enables an elevated system safety and reliable regulation of oxygen supply to the fuel cell device 4.

Pressure relief valve 66 can be used to release oxygen from the oxygen preparation device 6 via the ventilation line 67.

The fuel cell emergency system is inactive during normal aircraft operation. The power distribution unit 46 comprises electrical lines and switches 44, 45, and can be designed to automatically activate the fuel cell emergency system given an undersupply of power in the aircraft, and to provide the current or electrical energy generated by the fuel cell emergency system to the corresponding consumers in the aircraft. To this end, the metering and regulating valves 62 to 64 and 52 to 54 along with the relief valves 42, 43, 56, 66 and the switches 44, 45 may be automatically actuated by a central controller, e.g., integrated in the power distribution unit 46. The power distribution unit 46 can be designed as a regulating device for this purpose, which regulates the power output of the fuel cell device 4 and the raw materials supply to the fuel cells 41 (hydrogen and oxygen) according to the demand.

A converter unit 9 comprises a direct current/direct current converter 91 and direct current/alternating current converter 92. The converters 91, 92 are connected by lines 93, 94 and, if necessary, lines 95, 96 with the fuel cell device 4, and are used to generate a current/voltage characteristic suitable for onboard operation. This advantageously ensures that sufficient power will always be provided at a constant voltage, even in the case of fluctuating energy requirements. The converter system 9 can also be coupled with the power distribution unit 46, such that information is exchangeable between the converter unit 9 and the power distribution unit 46. For example, the power distribution unit 46 may increase the oxygen and hydrogen supply in response to a signal from the converter unit 9, which indicates that not enough power is being provided.

In an embodiment, the fuel cell emergency system can put out 40 kW of continuous electrical power for a half hour.

A cooling unit 7 can also be provided which is provided for cooling the fuel cells 41. The cooling unit 7 comprises a cooling element 71, a three-way valve 73, a pump 72, a filter 74 and a spill and/or coolant reservoir 75. Also provided are corresponding lines 76, 77. This establishes a cooling circulation that can keep the fuel cells 41 at an advantageous operating temperature. Naturally, the cooling system 7 can also be designed as a temperature regulating device 7, so as not just to cool the fuel cells 41 during operation, but also heat the fuel cells 41, e.g., so that the fuel cells can be started fast enough. As a result, the temperature of the fuel cells 41 may be kept within a predetermined range, e.g., at above 5° C. The cooling or temperature regulating system 7 can be coupled with the regulating device 46, so that a central regulation of cooling or heating capacity is achieved. This advantageously ensures that the startup phase of the fuel cell 41 lasts only a few seconds, depending on the requirements, e.g., flight control of the aircraft.

The fuel cell emergency system can also comprise a hydraulic pumping system 8, which comprises an electrically powered hydraulic pump 83 connected by corresponding lines 81, 28 with the converter 9. The motor governor of the hydraulic pump 83 can alternatively be supplied with electrical onboard power via a separate electrical connection, such that the pump 83 can be operated independently of the fuel cell emergency system.

If a power undersupply is detected on board the aircraft, the control and regulating valves 62 to 64 and 52 to 54 are set in such a way as to supply oxygen gas and hydrogen gas to the fuel cells 41 via lines 49, 48. The hydrogen gas and oxygen gas supplied to the fuel cells 41 is then used to generate electrical energy inside the fuel cell for emergency power supply in the aircraft. A central regulating or distribution device 46 can be used to regulate the individual components, such as the valves 62 to 64, 52 to 54, 57, 67, 41, 42, the temperature regulating device 7, the converter device 9 and the hydraulic pump 8.

The fuel cell emergency system, which is independent of the outside air, has very high system availability, since it has little or no moving components. In the event of a power supply failure, it is able to provide the necessary power fast enough. As opposed to the ram jet turbine, the power is released independently of flight altitude, flight velocity and angle of incident flow. The fill level of the pressure pumps can be electronically monitored. Due to the monitoring the maintenance costs are low, by comparison to the ram jet turbine, and the gas cylinders can be replaced during routine inspections, similarly to the fire extinguishing cylinders. The system can be subjected to a function test.

The outside air-independent emergency system can be used for operation on board passenger aircraft. The primary components of the system comprise a compact fuel cell stack 41, hydrogen and oxygen gas tanks 51, 61, pressure reduction, magneto-shutoff and regulating valves 62 to 64, 66, 52 to 54, 56, 41, 42 and, potentially, electrical converters 91, 92 in order to feed the electrical energy into the onboard network, as well as, potentially, a cooling system 7 for the fuel cell stack 41.

The hydrogen and oxygen tanks 51, 61 and their useable gas contents, in one example, may be dimensioned in such a way that the system operating time is sufficient to cover the remaining flight time given a failure of all engines. In this case, modern high-pressure gas tanks made of composites are advantageous, in that they enable favorable tank weights at the low required fuel quantities, and are characterized by low gas loss rates. The fill level of the pressure tanks can be electronically monitored. Monitoring combined with the low leakage makes it possible to achieve long maintenance intervals. The fuel cell supplies electrical power, which is converted based on the demand on board the aircraft, e.g., into hydraulic power for flight control by an electrically driven pump 83.

In addition, it must be noted that "comprising" does not preclude any other elements or steps, and "one" or "a" does not preclude a plurality. Let it further be noted that features or steps that were described with reference to one of the above exemplary embodiments can be used in combination with other features or steps from other exemplary embodiments described above. Reference symbols in the claims are not to be regarded as limiting.

Alternative combinations and variations of the examples provided will become apparent based on this disclosure. Its is not possible to provide specific examples for all of the many possible combinations and variations of the embodiments described, but such combinations and variations may be claims that eventually issue.

The invention claimed is:

1. An aircraft comprising an aircraft control system, a first power supply and an emergency power supply, the emergency power supply being comprised of an hydraulic pump and a fuel cell system for supplying emergency power to the hydraulic pump, wherein the fuel cell system comprises:
   a fuel cell;
   a first device comprising a hydrogen tank;
   a second device comprising an oxygen tank;
   a power distribution unit;
   a temperature regulating system is provided which is configured to heat the fuel cell;
   a detection unit, wherein the detection unit is configured to detect an undersupply of power to onboard consumers, and the first device and the second device are coupled to the fuel cell such that hydrogen is not supplied from the hydrogen tank to the fuel cell and oxygen is not supplied from the oxygen tank to the fuel cell until the detection unit detects a failure of the first power supply;
   wherein the emergency power supply is adapted to supply power to the aircraft in case of a failure of the first power supply; and
   wherein the first device couples the hydrogen tank to the fuel cell when the detection unit detects an undersupply of power and the power distribution unit activates the fuel cell system, such that the fuel cell is supplied with hydrogen from the hydrogen tank, and the second device couples the oxygen tank to the fuel cell when the detection unit detects an undersupply of power and the power distribution unit activates the fuel cell system, such that the fuel cell is supplied with oxygen from the oxygen tank and the emergency power supply is independent of any air outside of the full cell system; and
   wherein the hydraulic pump is configured to be driven by electricity generated by the fuel cell system of the emergency power supply, such that the hydraulic pump is designed to provide hydraulic power to the aircraft control system even if the first power supply fails.

2. The aircraft according to claim 1,
wherein the fuel cell is a low-temperature fuel cell; and is arranged inside a pressurized and air conditioned area of the aircraft.

3. The aircraft according to claim 1,
wherein the hydrogen tank is a hydrogen compressed gas cylinder; and
the oxygen tank is an oxygen compressed gas cylinder.

4. The aircraft according to claim 1, further comprising a sensor for detecting a pressure drop in the cabin, the sensor being coupled with the second device of the fuel cell system of the emergency power supply,
wherein the second device of the fuel cell system of the emergency power supply couples the oxygen tank of the second device to an emergency oxygen supply system, such that the emergency oxygen supply system is activated, supplying passengers with emergency oxygen from the oxygen tank of the second device, when the sensor coupled with the second device of the fuel cell system of the emergency power supply detects a pressure drop in the cabin.

5. The aircraft according to claim 1, the emergency power supply further comprising:
a converter capable of generating a current/voltage characteristic suitable for onboard operation.

6. The aircraft according to claim 1, the emergency power supply further comprising:
a cooling system designed for cooling at least the fuel cell.

7. The aircraft according to claim 6, the emergency power supply further comprising:
a temperature regulating and heating device integrated into the cooling system capable of regulating a temperature of the fuel cell, such that the temperature of the fuel cell is maintainable within a predetermined range.

8. The aircraft according to claim 1, the emergency power supply further comprising:
a motor governor for the hydraulic pump; wherein the motor governor for the hydraulic pump comprises an additional electrical connection to an onboard power supply in addition to power supplied via the fuel cell system.

9. The aircraft of claim 1,
wherein the hydrogen tank is a hydrogen compressed gas cylinder and wherein the oxygen tank is an oxygen compressed gas cylinder, and the hydrogen compressed gas cylinder and the oxygen compressed gas cylinder are both stored in the aircraft so as to be accessible for inspection and replacement by maintenance personnel.

* * * * *